July 2, 1957  F. H. LEAKE  2,797,851
FISHING ROD SUPPORT
Filed Feb. 14, 1955

FRANK H. LEAKE,
INVENTOR.

BY O. O. Martin

ATTORNEY.

ated July 2, 1957

2,797,851
FISHING ROD SUPPORT
Frank H. Leake, Glendale, Calif.

Application February 14, 1955, Serial No. 487,777

8 Claims. (Cl. 224—42.45)

This invention relates to fishing rods and has particular reference to improvements in means for supporting fishing rods on automobiles. Many types of fishing rod supports have been devised and such as have come to my notice include suction cups, straps and clamps securely to lock the rods in position on the automobile.

It is the general object of my invention to provide a couple of simple, one-piece elements which may be mounted directly on the windows of the car and removed at any time therefrom without affecting or marring the appearance of the car. Other objects, together with the many advantageous features of the invention will be apparent from the following detailed description of my device and by referring to the accompanying drawing in which a preferred form of the invention is illustrated.

Figure 1:
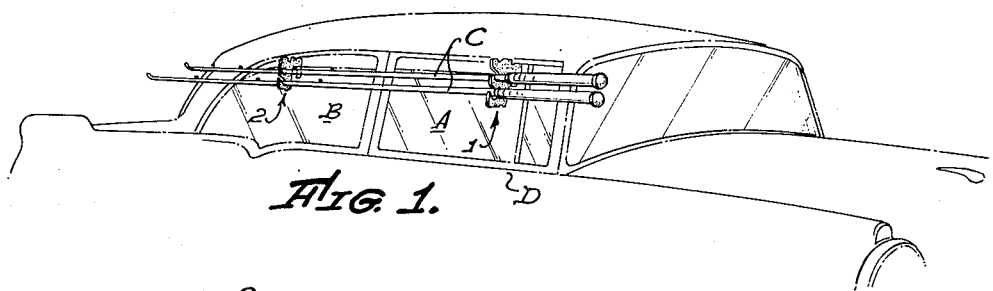
Fig. 1 is a general outline of the upper part of an automobile to which the devices of the invention are shown attached.
Figure 2:
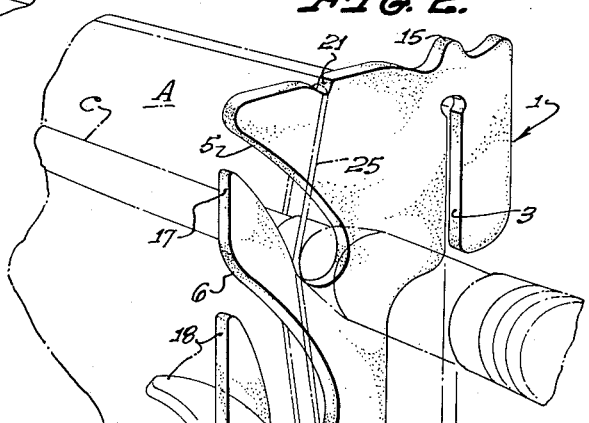
Figure 4:
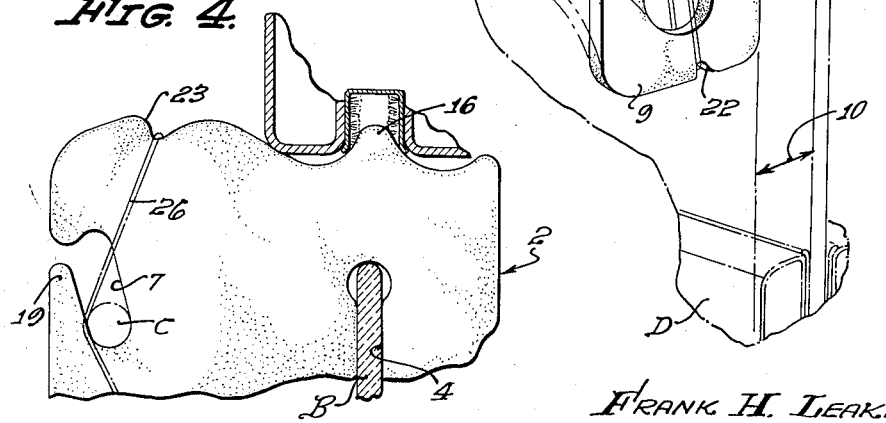
Fig. 4 illustrates other important features of the device.

The device of the invention in the form illustrated in the drawings consists of two thin, flat plates forming brackets 1, 2 which at 3, 4 are shown slotted to engage the upper edges of the window panes A, B, of the doors at one side of an automobile. The opposite side edge of each bracket is shown recessed to provide inwardly and downwardly directed grooves 5, 6 and 7, 8, the bottoms of which form seats for fishing rods C. It is important to note that the grooves 5, 6 of one bracket at the bottoms thereof are wide enough to receive the thicker portions of the rods at the handles thereof, whereas the grooves 7, 8 of the other bracket are of a size to support the smaller end portions of the rods. The brackets and the rods carried therein may be placed as indicated in Fig. 1 and as shown in phantom outline in Figs. 2 and 3.

Figure 3:
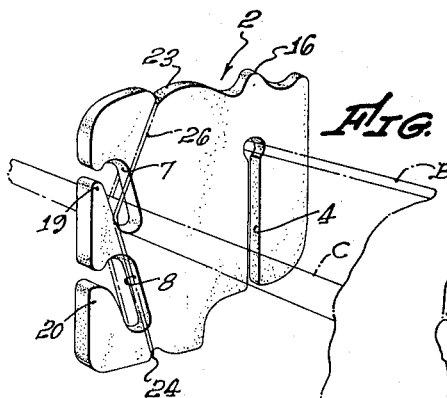
Figs. 2 and 3 show, perspectively, the manner in which fishing rods may be held firmly in position in the devices of the invention.

It is to be noted that the grooves are placed far enough away from the window pane to provide clearance for the fishing rods along the side surface of the car. Also that sufficient space 10 is provided between the lower portion 9 of the bracket 1 and the window for the bracket to clear the sill D of the car door when the window pane is adjusted to move the bracket into its lowermost position. Since the grooves 7, 8 of the bracket 2 can be made so much smaller than the grooves of the bracket 1, this lower bracket portion 9 of the bracket 1 may be and in Fig. 3 is shown substantially eliminated from bracket 2. In addition, it is to be noted that projections 15, 16 rise from the brackets in continued alinement with the slots 3, 4 and these projections are of a size, to engage the slot E of the upper window framing when the window pane is raised into its uppermost position.

The brackets are made from rubber or any other suitable composition of the strength required to maintain the brackets firmly in position and resilient enough tightly to maintain the rods in position on their seats. In this connection, it is to be noted that the grooves 5—8 are much narrower at the upper ends thereof than they are at the bottom. This is done in order firmly to lock the rods in position. And when the material of the brackets is sufficiently resilient, it is possible to bend the lips 17—20 to one side substantially, as indicated in phantom outline in Fig. 2, to make entering of the rods possible. The lips will then spring back into position and will maintain the rods on their seats. Should it, however, be found advisable to provide additional means for maintaining the rods on their seats, it is merely required to place notches 21—24 in the upper and lower surfaces of the brackets and to slip rubber bands 25, 26 into these notches.

It is seen from the foregoing description that I have provided a very simple and inexpensive fishing rod support which may be placed on car windows without any additional fastening means and which will not mar the appearance of the car surface. But while the embodiment of the invention as herein disclosed constitutes a preferred form, it is to be understood that modifications within the scope of the claims hereto appended may be embodied therein without departing from the spirit of the invention.

I claim:

1. A fishing rod supporting device mountable on the window panes of a car, said device comprising two thin flat plates forming vertically directed brackets, the brackets being made from soft, resilient material, each bracket having nearer one side edge thereof vertically directed slots open at the bottom and of a width snugly to engage the upper portions of the front and rear window panes of the car, the opposite side edges of the brackets being inwardly and downwardly recessed to provide fishing rod seats of a size tightly to grip the rods seated in the recesses of the brackets.

2. A device as set forth in claim 1 in which the recesses of one bracket are of a size tightly to grip the handle of the rod, the recesses of the other bracket being shaped tightly to hold a portion of the rod extending from the handle.

3. A device as set forth in claim 1 in which the recesses in the bracket are laterally spaced far enough away from the slots for the fishing rods to clear the framing of the car windows and the side surfaces of the car.

4. A device as set forth in claim 1 in which the upper entrance to each recess is narrower than the thickness of the rod portion seatable therein, the bracket material at the recess entrance being capable of lateral flexion to admit the rod portion into its seat, the released material gripping the rod portion tightly within the seat.

5. A device as set forth in claim 1 in which notches are sunk into the upper and lower edges of the brackets, and means seatable in the notches to lock the rods against removal from the bracket recesses.

6. A fishing rod supporting device mountable on the window panes of a car, said device comprising two thin flat vertically directed brackets made from soft resilient material, each bracket having nearer one side edge thereof vertically directed slots open at the bottom and of a width snugly to engage the upper portions of the front and rear window panes of the car, the bracket having projections rising from the upper edges thereof in vertical alinement with the slots and of a size to engage the pane guiding grooves at the top of the car windows when the panes are raised nearly to close the windows, the opposite side edges of the brackets being inwardly and downwardly recessed to provide firmly gripping fishing rod seats in the brackets.

7. A device as set forth in claim 6 in which the recesses of the brackets are of a size snugly to grip different rod portions, the bracket material being capable of lateral flexing to admit the rod portions to the seats.

8. A device as set forth in claim 6 in which the recesses of the brackets are spaced away laterally from the slots far enough for the fishing rods to clear the framing of the windows and side surfaces of the car.

References Cited in the file of this patent

UNITED STATES PATENTS

| | | |
|---|---|---|
| 2,302,300 | Davies | Nov. 17, 1942 |
| 2,344,339 | Zwald | Mar. 14, 1944 |
| 2,464,068 | Bear | Mar. 8, 1949 |
| 2,480,597 | Nelson | Aug. 30, 1949 |
| 2,536,797 | Cooke | Jan. 2, 1951 |